United States Patent
Jones et al.

(10) Patent No.: US 9,278,655 B2
(45) Date of Patent: Mar. 8, 2016

(54) FOLDABLE SUBSTRATES FOR MOTOR VEHICLES AND METHODS FOR MAKING THE SAME

(75) Inventors: Stephen Jones, Commerce Township, MI (US); Daniel Vander Sluis, Rochester Hills, MI (US)

(73) Assignee: FAURECIA INTERIOR SYSTEMS, INC., Auburn Hills, MI (US)

(*) Notice: Subject to any disclaimer, the term of this patent is extended or adjusted under 35 U.S.C. 154(b) by 116 days.

(21) Appl. No.: 13/568,249

(22) Filed: Aug. 7, 2012

(65) Prior Publication Data

US 2013/0040076 A1 Feb. 14, 2013

Related U.S. Application Data

(60) Provisional application No. 61/521,248, filed on Aug. 8, 2011.

(51) Int. Cl.
*B32B 3/30* (2006.01)
*B60R 13/02* (2006.01)
(Continued)

(52) U.S. Cl.
CPC ............ *B60R 13/02* (2013.01); *B29C 45/14467* (2013.01); *B29C 45/0055* (2013.01);
(Continued)

(58) Field of Classification Search
CPC ............ B65D 1/22; B65D 1/40; B65D 1/225; B65D 11/1833; B65D 43/161; B65D 43/16; B65D 43/14; B60R 13/02; B60R 13/0275; B60R 13/0256; B29C 45/14467; B29C 59/00
USPC ........ 428/67, 121, 131, 156, 35.7, 36.1, 36.3, 428/36.4, 36.92, 12; 224/282, 483, 539, 224/544; 220/4.28, 6, 7, 677, 682, 690, 220/691, DIG. 23, 836, 837, 839, 838; 264/145, 153, 154, 162, 138
See application file for complete search history.

(56) References Cited

U.S. PATENT DOCUMENTS 2,269,113 A    1/1942  Kasch
3,145,904 A *  8/1964  Bromley ........................ 220/62
(Continued)

FOREIGN PATENT DOCUMENTS

DE    19716409 A1    10/1998
EP     2113429 A1    11/2009
(Continued)

OTHER PUBLICATIONS

Evidentiary reference, Krishnamachari, Applied Stress Analysis of Plastics; a mechanical approach, 1993.*
(Continued)

*Primary Examiner* — Maria Veronica Ewald
*Assistant Examiner* — Joanna Pleszczynska
(74) *Attorney, Agent, or Firm* — Ingrassia Fisher & Lorenz PC

(57) ABSTRACT

Embodiments of foldable substrates and methods for making foldable substrates for a motor vehicle are provided herein. The foldable substrate comprises a first wall that has a first outer surface. The first wall comprises a first natural fiber-resin impregnated blank section that is overmolded with a first quantity of polymeric resin that forms at least a portion of the first outer surface. A second wall has a second outer surface. The second wall comprises a second natural fiber-resin impregnated blank section that forms at least a portion of the second outer surface. The first and second walls are hingedly connected together.

14 Claims, 8 Drawing Sheets

(51) Int. Cl.
 B29C 45/14 (2006.01)
 B29C 45/00 (2006.01)
 B29L 31/30 (2006.01)

(52) U.S. Cl.
 CPC ..... *B29C45/14336* (2013.01); *B29C 45/14786* (2013.01); *B29L 2031/30* (2013.01); *B60R 13/0256* (2013.01); *B60R 13/0275* (2013.01)

(56) References Cited

U.S. PATENT DOCUMENTS

| | | | |
|---|---|---|---|
| 4,953,735 A * | 9/1990 | Tisbo et al. | 220/6 |
| 5,344,004 A * | 9/1994 | Meyer | 206/45.25 |
| 2006/0138183 A1 | 6/2006 | Hein et al. | |
| 2007/0141318 A1 | 6/2007 | Balthes | |
| 2009/0039154 A1* | 2/2009 | Williams et al. | 235/380 |
| 2009/0090709 A1* | 4/2009 | Shalomoff | 220/6 |
| 2009/0163851 A1 | 6/2009 | Holloway et al. | |
| 2011/0072748 A1 | 3/2011 | Simonson et al. | |
| 2012/0060676 A1 | 3/2012 | Kidd et al. | |
| 2014/0107534 A1 | 4/2014 | Du et al. | |

FOREIGN PATENT DOCUMENTS

| | | |
|---|---|---|
| FR | 2937277 A1 | 4/2010 |
| GB | 2422137 A | 7/2006 |

OTHER PUBLICATIONS

European Patent Office, International Searching Authority, "International Search Report and Written Opinion" mailed Oct. 25, 2012; International Appln. No. PCT/US2012/049929, filed Aug. 8, 2012.

Wikipedia, Flexural modulus [online], [retrieved on May 27, 2014]. Retrieved from Internet: <URL: http://en.wikipedia.org/wiki/Flexural_modulus>.

Wikipedia, Intensive and extensive properties [online], [retrieved on May 27, 2014]. Retrieved from Internet: <URL: http://en.wikipedia.org/wiki/Intensive_and_extensive_properties>.

The International Bureau of WIPO, International Preliminary Report on Patentability for International Application No. PCT/US2012/049929, mailed Feb. 20, 2014.

* cited by examiner

FOLDABLE SUBSTRATES FOR MOTOR VEHICLES AND METHODS FOR MAKING THE SAME

CROSS-REFERENCE TO RELATED APPLICATIONS

This application is related to and claims all available benefit of U.S. Provisional Patent Application 61/521,248 filed Aug. 8, 2011, the entire contents of which are herein incorporated by reference.

FIELD OF THE INVENTION

The present invention relates generally to substrates and methods for making substrates, and more particularly to foldable substrates and methods for making foldable substrates that can be efficiently packaged and shipped in an unfolded condition and can be folded for use in a motor vehicle, such as, for example, as a vehicle trim and/or structural component and the like.

BACKGROUND OF THE INVENTION

In the transportation industry, there is considerable impetus for the reduction of weight of vehicle components. In many cases, for example, the reductions in weight are necessary to achieve designated fuel economy standards that are becoming even more stringent. Alternative designs of many vehicle components are often considered particularly in the automotive sector as well as in other transportation industries if the resulting parts can achieve significant weight savings, and even more so when the alternative designs further provide a cost benefit.

There are many vehicle parts for which weight savings are desired. For example, in the automotive industry, interior or exterior trim components and/or structural components, such as door trims and modules, consoles, instrument panels, and storage boxes for doors, consoles, and instrument panels, e.g., glove boxes, are but a few such items. Many of these components are made from relatively low density, flexible plastic materials that can be readily molded into various 3-Dimensional shapes instead of being made from higher density, stiffer materials, such as metals and glass fiber-reinforced plastics, where forming 3-Dimensional shapes can be more challenging.

One example of a conventional vehicle component that is made from a relatively low density thermoplastic material is a one-piece, injection molded polypropylene glove box bin. The one-piece glove box bin has molded-in ribs on a rearward facing surface that are vibration welded to a plastic lid that has a Class "A" surface, and two molded-in standing side walls that are formed on a forward facing surface and that define the 3-Dimensional box shape of the bin. Unfortunately, although the polypropylene that forms the bin has a relatively low density of from about 1 to about 1.5 grams per cubic centimeter (g/cc), the bin has a relatively typical area weight (e.g. weight per unit area) of from about 2,300 to about 3,300 grams per meter$^2$ (g/m$^2$). This is because the bin requires a relatively thick wall stock of from about 2.5 to about 3.5 millimeter (mm) for adequate structure due to the flexibility or relatively low specific modulus (e.g. stiffness as a function of density) of the polypropylene. Moreover, packaging and shipping of the one-piece glove box bins prior to being installed in vehicles is inefficient and adds to the cost of the bins because the two standing side wails that are molded-in prevent the bins from being stacked on each other for packaging and shipping.

An attempt to resolve at least some of these problems was disclosed in U.S. Patent Application Publication No. 2006/0138183, issued to Hein et al. (hereinafter "the '183 patent application"). The '183 patent application describes a foldable sheet that is molded from a relatively low density, flexible polypropylene and that can be folded to form a glove box for mounting in a vehicle. The foldable sheet "as molded" is substantially flat and can be efficiently stacked for packaging and shipping. Unfortunately, the foldable sheet has a relatively typical area weight because although the polypropylene has a relatively low density, it has a low specific modulus and will therefore require a relatively thick wall stock for adequate structure.

Accordingly, it is desirable to provide a foldable substrate for a motor vehicle that can be efficiently stacked for packaging and shipping to provide a cost benefit and that can be folded to form a vehicle component that has a relatively low area weight for a significant weight savings. Furthermore, other desirable features and characteristics of the present invention will become apparent from the subsequent detailed description of the invention and the appended claims, taken in conjunction with the accompanying drawings and this background of the invention.

SUMMARY OF THE INVENTION

Foldable substrates and methods for making foldable substrates for a motor vehicle are provided herein. In accordance with an exemplary embodiment, a foldable substrate for a motor vehicle comprises a first wall that has a first outer surface. The first wall comprises a first natural fiber-resin impregnated blank section that is overmolded with a first quantity of polymeric resin that forms at least a portion of the first outer surface. A second wall has a second outer surface. The second wall comprises a second natural fiber-resin impregnated blank section that forms at least a portion of the second outer surface. The first and second walls are hingedly connected together.

In accordance with another exemplary embodiment, a method for making a foldable substrate for a motor vehicle is provided. The method comprises the steps of forming a first wall having a first outer surface. The first wall comprises a first natural fiber-resin impregnated blank section that is overmolded with a polymeric resin that forms at least a portion of the first outer surface. A second wall is formed that has a second outer surface. The second wall comprises a second natural fiber-resin impregnated blank section that forms at least a portion of the second outer surface. A hinge section is formed that hingedly connects the first and second walls together. Forming the hinge section includes defining at least one fold-initiating groove, at least one slit, at least one perforation, or combinations thereof in the hinge section to facilitate folding of the foldable substrate from an unfolded condition to a folded condition.

BRIEF DESCRIPTION OF THE DRAWINGS

Embodiments of the present invention will hereinafter be described in conjunction with the following drawing FIGS., wherein like numerals denote like elements, and wherein.

DETAILED DESCRIPTION

Figure 1:
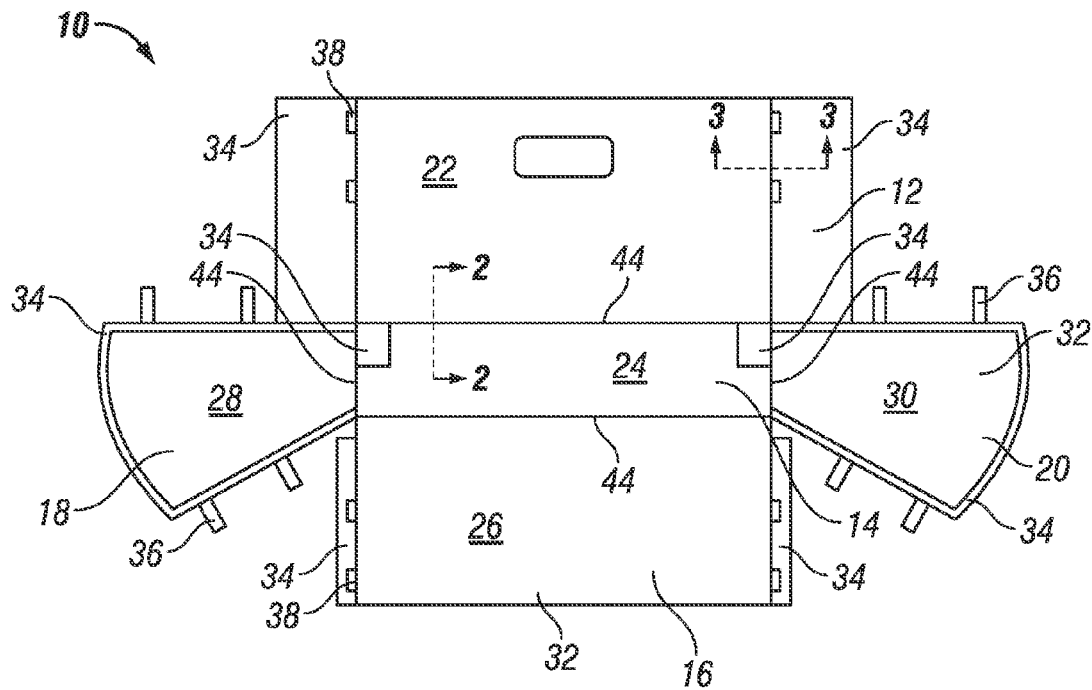
FIG. 1 is a plan view of a foldable substrate in accordance with an exemplary embodiment.

The following Detailed Description is merely exemplary in nature and is not intended to limit the invention or the application and uses of the invention. Furthermore, there is no intention to be bound by any theory presented in the preceding Background of the Invention or the following Detailed Description.

Various embodiments contemplated herein relate to foldable substrates and methods for making foldable substrates for a motor vehicle. Unlike the prior art, the exemplary embodiments taught herein provide a foldable substrate comprising at least two walls including a first wall hingedly connected to a second wall, where each of the walls comprises a section of a natural fiber-resin impregnated blank. As used herein, the terms "hinge," "hingedly connected," and "hinge section" refer to an area that is capable of being folded one time or folded back and forth multiple times. For example, an area that is capable of and intended to be folded only one time functions as a hinge and so does an area that is capable of and intended to be folded back and forth two or more times. The natural fiber-resin impregnated blank sections are formed from a natural fiber-resin impregnated sheet that is, for example, compression molded in a heated condition and cooled to form the natural fiber-resin impregnated blank. The natural fiber-resin impregnated blank comprises natural fibers (e.g. fibers from a lignocellulosic material or other biological source) and a resin (e.g. thermoplastic or thermoset resin) that binds the natural fibers together. The natural fibers function as reinforcing elements and the resin functions as a load transferring matrix between the reinforcing elements. As such, the natural fiber-resin impregnated blank is reinforced and relatively stiff, for example, having a flexural modulus of from about 40 to about 90 MPa. The natural fiber-resin impregnated blank may be formed relatively thin via compression and/or compaction, for example, having a wall stock of from about 1.5 to about 5.0 mm and be sufficiently stiff for many vehicle interior and/or exterior trim component and/or structural component applications. Note, it is believed that compressing and/or compacting the natural fiber-resin impregnated blank during the molding process enhances its stiffness by improving the load transferring efficiency between the resin matrix and the reinforcing elements. Moreover, because both the natural fibers and the resin binder have relatively low densities, the density of the natural fiber-resin impregnated blank is relatively low, such as, for example, of from about 0.9 to about 1 g/cc. Accordingly, the natural fiber-resin impregnated blank has a relatively high specific modulus and a relatively low area weight. In an exemplary embodiment, the natural fiber-resin impregnated blank has an area weight of from about 1200 to about 2200 g/m².

Separated or continuous sections of the natural fiber-resin impregnated blank are used to form the first and second walls of the foldable substrate. The first and second walls are formed, for example, by injection molding a polymeric resin over at least a portion of at least one of the sections of the natural fiber-resin impregnated blank such that at least a portion of the first wall comprises a natural fiber-resin impregnated blank section overmolded with the polymeric resin and the second wall comprises a natural fiber-resin impregnated blank section that may or may not be overmolded with the polymeric resin. A hinge section in the foldable substrate is formed for hingedly connecting the first and second walls together either before, during, or after overmolding with the polymeric resin. In an exemplary embodiment, the hinge section and the foldable substrate is formed before overmolding by compression molding a natural fiber-resin impregnated sheet to form a continuous natural fiber-resin impregnated blank that has a fold-initiating groove and/or other fold-initiating feature(s) that is formed along an intermediate portion of the blank defining the hinge section. The fold-initiating groove and/or other fold-initiating feature(s) can be formed during compression molding, for example, via a positive feature (e.g., wire, blade, and/or the like) or features projecting from the mold cavity or core, a slide, and/or the like. Next, at least a portion of the continuous natural fiber-resin impregnated blank is overmolded with the polymeric resin such that the hinge section is positioned between the two walls to define the foldable substrate. The hinge section facilitates folding of the foldable substrate from an unfolded condition to a folded condition. In an exemplary embodiment, positive and/or negative features are formed in the overmolded portions of the foldable substrate for locating and/or securing the walls of the foldable substrate in the folded condition for use in a motor vehicle.

Preferably, the foldable substrate is formed substantially of the natural fiber-resin impregnated blank with some overmolded plastic or other polymeric material as needed for functionality and aesthetics so that the substrate has a low area weight for a significant weight savings. Moreover, preferably the walls of the foldable substrate are relatively flat and/or have relatively simple 3-Dimensional geometries such that when the foldable substrate is in the unfolded condition, e.g., "as molded," it has a relatively low profile (e.g. minimal height) so that the substrate can be efficiently stacked for packaging and shipping to provide a cost benefit.

Referring to FIG. 1, a plan view of a foldable substrate 10 in accordance with an exemplary embodiment is provided. As illustrated, the foldable substrate 10 comprises a plurality of walls including a first wall 12, a second wall 14, a third wall 16, a fourth wall 18, and a fifth wall 20. Although the foldable substrate 10 is shown as having five walls, it will be appreciated that a foldable substrate may include more than five walls or less than five walls but will have at least two walls. Each of the walls 12, 14, 16, 18, and 20 comprises a natural fiber-resin impregnated blank section 22, 24, 26, 28, and 30, respectively. The natural fiber-resin impregnated blank sections 22, 24, 26, 28, and 30 correspond to various sections of a natural fiber-resin impregnated blank 32, which is shown in this embodiment as being a single continuous piece. Although each of the walls 12, 14, 16, 18, and 20 are shown as comprising a natural fiber-resin impregnated blank section 22, 24, 26, 28, and 30, it will be appreciated that less than all of the walls 12, 14, 16, 18, and 20 but at least two of the walls 12, 14, 16, 18, and 20 comprise a natural fiber-resin impregnated blank section 22, 24, 26, 28, and 30. For example, the first and second walls 12 and 14 may include the natural fiber-resin impregnated blank sections 22 and 24 while the third wall 16 may be formed from an inorganic fiber (e.g. glass fiber or carbon fiber) reinforced composite blank section instead of comprising the natural fiber-resin impregnated blank section 26.

The natural fiber-resin impregnated blank 32 comprises natural fibers and a resin that binds the natural fibers together. Non-limiting examples of natural fibers include wood flour, wood fibers, kenaf fibers, hemp fibers, flax fibers, jute fibers, sisal fibers, other fibers from lignocellulosic or biological sources, and the like. Moreover, the natural fibers may be any suitable shape (e.g. particulates, powder, whiskers, continuous, discontinuous, and the like) or length, such as, for example, nano-size fibers or larger up to several centimeters in length or greater. Non-limiting examples of the resin include thermoplastic resins, such as polypropylene, polyester, thermoplastic polyurethane resin, and the like, and thermoset resins such as phenolic resin, acrylic resin, epoxy resin, thermosetting polyurethane resin, and the like. Preferred resins are thermoplastic resins including polypropylene and polyester, and most preferred is polypropylene. Additionally, the natural fiber-resin impregnated blank 32 may also include a natural binder such as lignin (e.g. wood flour may contain natural fibers with some lignin), inorganic or organic fillers and sizing agents, inorganic reinforcing elements such as glass fibers (e.g. E-glass, S-glass, and the like) or carbon fibers, and/or other suitable additives or reinforcements known to those skilled in the art.

In an exemplary embodiment, the natural fibers are present in an amount of from about 50 to about 99 weight percent (wt. %) of the natural fiber-resin impregnated blank 32, and the resin is present in an amount of about 1 to about 50 wt. % of the natural fiber-resin impregnated blank 32. Primarily for manufacturability and structural integrity reasons, the natural fibers are preferably present in the natural fiber-resin impregnated blank 32 in an amount of at least, with increasing preference in the order given, 50, 55, 60, 65, 70, 75, 80, 85, or 89 wt. % of the natural fiber-resin impregnated blank 32, and independently is not more than, with increasing preference in the order given, 99, 98, 97, 96, 95, 94, 93, 92, or 91 wt. % of the natural fiber-resin impregnated blank 32. Preferably, the resin is present in the natural fiber-resin impregnated blank 32 in an amount of at least, with increasing preference in the order given, 1, 2, 3, 4, 5, 6, 7, 8, or 9 wt. % of the natural fiber-resin impregnated blank 32, and independently is not more than, with increasing preference in the order given, 50, 45, 40, 35, 30, 25, 20, 15, or 11 wt. % of the natural fiber-resin impregnated blank 32.

The natural fiber-resin impregnated blank 32 preferably has a relatively low density of from about 0.9 to about 1 g/cc and a relatively high flexural modulus of about 40 to about 90 MPa. Depending upon the application and the structural requirements of the application, the wall stock thickness of the natural fiber-resin impregnated blank 32 may differ. However, the natural fiber-resin impregnated blank 32 can have a wall-stocked thickness of from about 1.5 to about 5.0 mm for many vehicle interior and/or exterior trim component and/or structural component applications due to the stiffness of the natural fiber-resin impregnated blank 32. As such, the natural fiber-resin impregnated blank 32 preferably has a relatively low area weight of from about 1200 to about 2200 g/m$^2$.

As discussed in further detail below, the natural fiber-resin impregnated blank 32 is formed, for example, by compression molding a natural fiber-resin impregnated sheet. Some non-limiting examples of suitable natural fiber-resin impregnated sheets for producing the natural fiber-resin impregnated blank 32 are FlexForm® MT, FlexForm® LD, FlexForm® HD, and FlexForm® T10, manufactured by FlexForm® Technologies, located in Elkhart, Ind.

As illustrated, each of the walls 12, 14, 16, 18, and 20 have a quantity of polymeric resin 34 that is overmolded via injection molding or the like onto at least a portion of the natural fiber-resin impregnated blank sections 22, 24, 26, 28, and 30. Although each of the walls 12, 14, 16, 18, and 20 are shown as having the polymeric resin 34 overmolded thereon, it will be appreciated that less than all of the walls 12, 14, 16, 18, and 20 but at least one of the walls 12, 14, 16, 18, and 20 comprises the polymeric resin 34, Non-limiting examples of the polymeric resin 34 include thermoplastic resins, such as polypropylene, polypropylene/polyethylene, polyethylene, polyester, polyamide, polycarbonate, ABS, SMA, PAR, thermoplastic elastomers, such as, for example, TPU, TPE, TPO, copolyesters, and styrenics, and the like. Alternatively, non-limiting examples of the polymeric resin 34 include thermosetting resins, such as epoxies, phenolics, unsaturated polyesters, polyurethanes, silicones, vinyl esters, vulcanizing or curing type elastomers, such as, for example, styrene butadiene rubber, EPDM, nitrile rubber, and neoprene rubber, and the like. Other suitable thermoplastic resins or thermosetting resins known to those skilled in the art may be used for the polymeric resin 34.

The polymeric resin 34 provides functionality and/or aesthetics to the foldable substrate 10. In an exemplary embodiment, the polymeric resin 34 forms positive features 36 (e.g. tabs, locators, heat staking or welding features, snap fit features, and the like) and negative features 38 (e.g., holes, slots, and the like). As will be discussed in further detail below, the positive features 36 and the negative features 38 provide functionality for locating and/or securing the foldable substrate 10 in a folded condition.

Figure 3A:
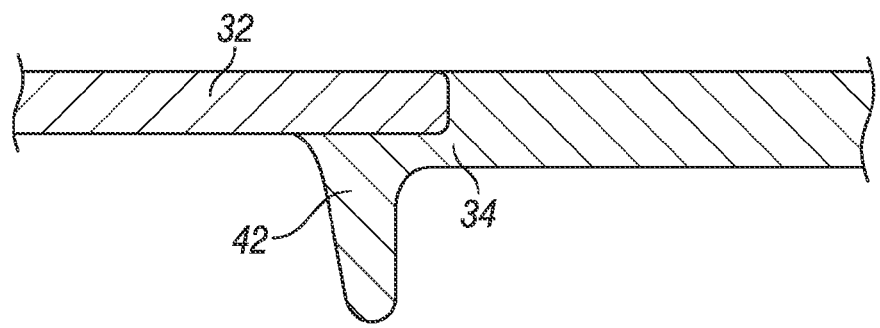
FIGS. 3A-3D are sectional views of a portion of the foldable substrate depicted in FIG. 1 along line 3-3 in accordance with various exemplary embodiments.
Figure 3B:
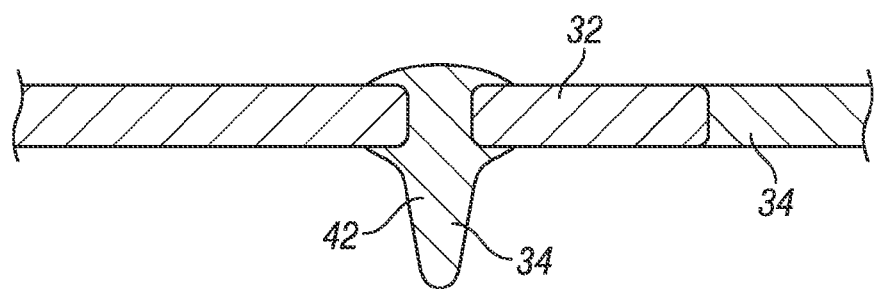
Figure 3C:
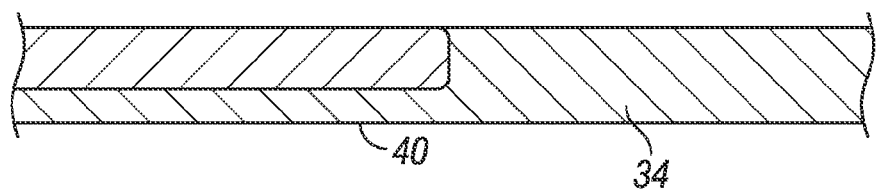
Figure 3D:
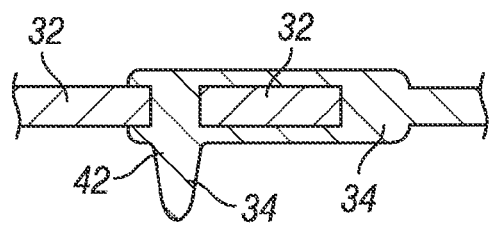

Referring to FIGS. 3A-3B and 3D, the polymeric resin 34 may also form one or more ribs 42 along any of the walls 12, 14, 16, 18, and 20 to add structure and/or an attachment surface (e.g. welding surface for attaching a lid/cover or the like) to the foldable substrate 10. In another embodiment and with reference to FIG. 3C, the polymeric resin 34 is overmolded overlying the first section 22 of the natural fiber-resin impregnated blank 32 to define a Class "A" outer surface 40 for the first wall 12 to provide an aesthetic appearance, such as for an outer surface of a glove box door and the like. As is well known in the automotive arts, a Class "A" surface is a surface having an aesthetically pleasing finish that is suitable for display to a customer, for example, on an interior surface in a passenger compartment of a vehicle. By forming a Class "A" surface on the first wall 12 of the foldable substrate 10, the foldable substrate may be used for first surface aesthetically pleasing vehicle trim applications without requiring any additional decorating, thereby providing a cost benefit. Additionally, a decorative cloth, decorative textile, and/or flocking (not shown) may be adhesively bonded, in-molded or otherwise affixed along an inner or outer surface(s) of any of the wails 12, 14, 16, 18, and/or 20 (e.g., correspondingly affixed over one or more portions of the natural fiber-resin impregnated blank sections 22, 24, 26, 28, and/or 30 and/or the polymeric resin 34) for aesthetics, craftsmanship, and/or tactile feel. The decorative cloth, decorative textile, and/or flocking may be cut or slit as needed to facilitate folding of the walls 12, 14, 16, 18, and/or 20 as will be discussed in further detail below.

Referring back to FIG. 1, preferably the foldable substrate 10 substantially comprises the natural fiber-resin impregnated blank 32, and the polymeric resin 34 is only selectively molded over portions of the sections 22, 24, 26, 28, and 30 of the natural fiber-resin impregnated blank 32 to provide the desired functionality and/or aesthetics. As such, the foldable substrate 10 preferably has a relatively low area weight that substantially corresponds to the area weight of the natural fiber-resin impregnated blank 32, thereby providing a weight savings.

Figure 2A:
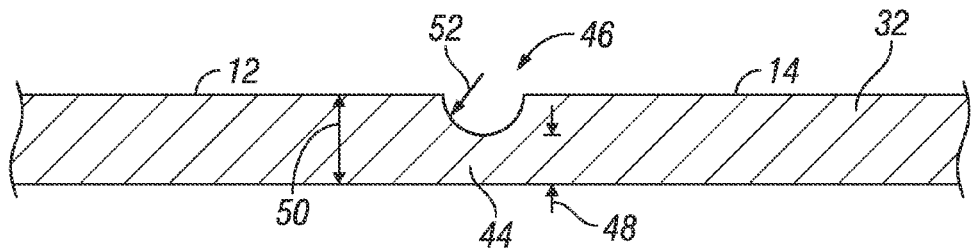
FIGS. 2A-2H are sectional views of a portion of the foldable substrate depicted in FIG. 1 along line 2-2 in accordance with various exemplary embodiments.
Figure 2B:
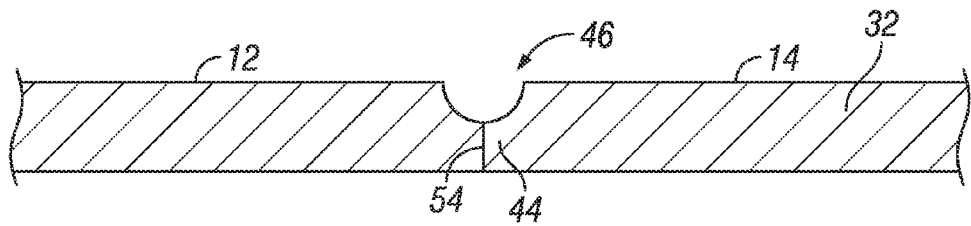
Figure 2C:
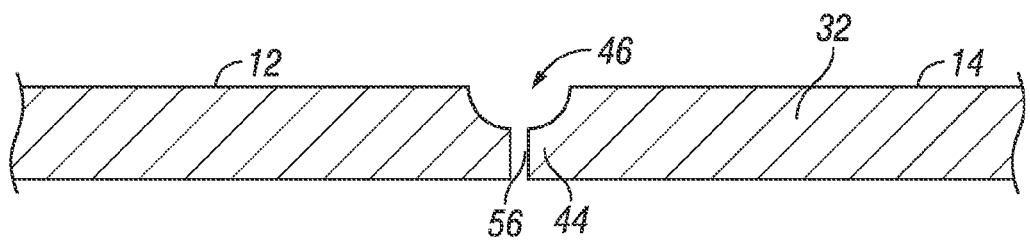

The foldable substrate 10 comprises one or more hinge sections 44 that hingedly connects two or more of the walls 12, 14, 16, 18, and 20 together. As illustrated in FIG. 2A, the hinge section 44 may be formed in the natural fiber-resin impregnated blank 32. In particular, a fold-initiating groove 46 may be formed in the natural fiber-resin impregnated blank between two of the walls 12 and 14. The fold-initiating groove 46, which may be continuous or segmented, locally focuses folding stresses immediately adjacent to the two walls 12 and 14 to facilitate folding the walls 12 and 14 from an unfolded condition to a folded condition. In one embodiment, the hinge section 44 has a reduced thickness 48 of from about 20 to about 95% of an average thickness 50 of the two walls 12 and 14 to facilitate folding of the walls 12 and 14. In another embodiment, the fold-initiating groove 46 has a radius 52 of from about 0.25 to about 5 mm to facilitate folding of the walls 12 and 14. Referring to FIGS. 2B and 2C, in addition to the fold-initiating groove 46 or instead of the fold-initiating groove 46, the hinge section 44 may have a slit 54 and/or a perforation 56 (e.g. aperture) to locally focus folding stresses immediately adjacent to the two walls 12 and 14 to facilitate folding of the walls 12 and 14. The slit 54 and/or the perforation 56 may be continuous or segmented.

Figure 2D:
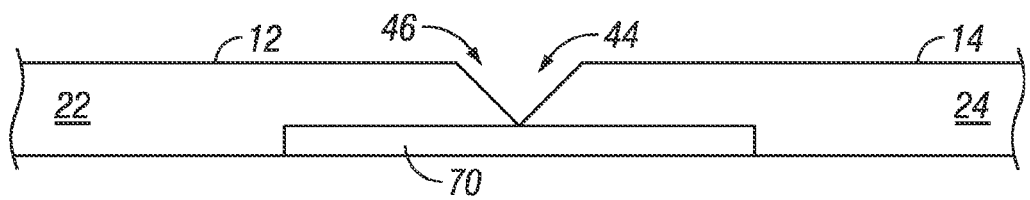
Figure 2E:
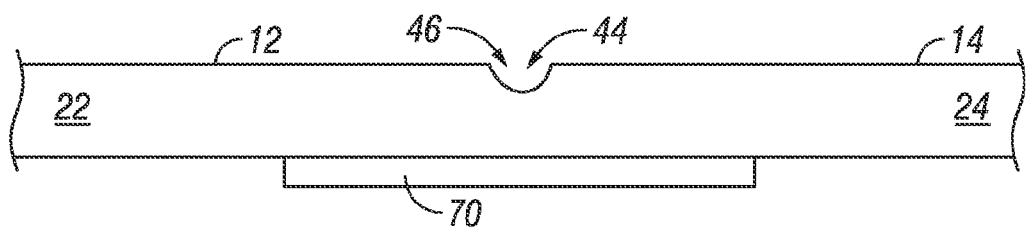
Figure 2F:
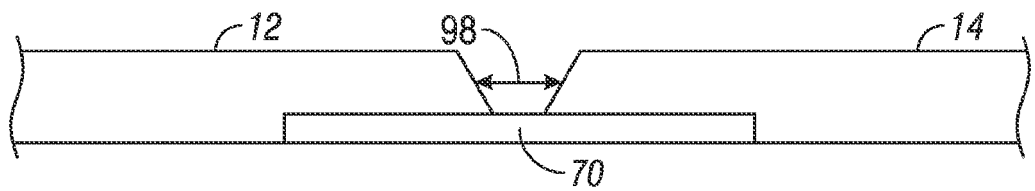
Figure 2G:
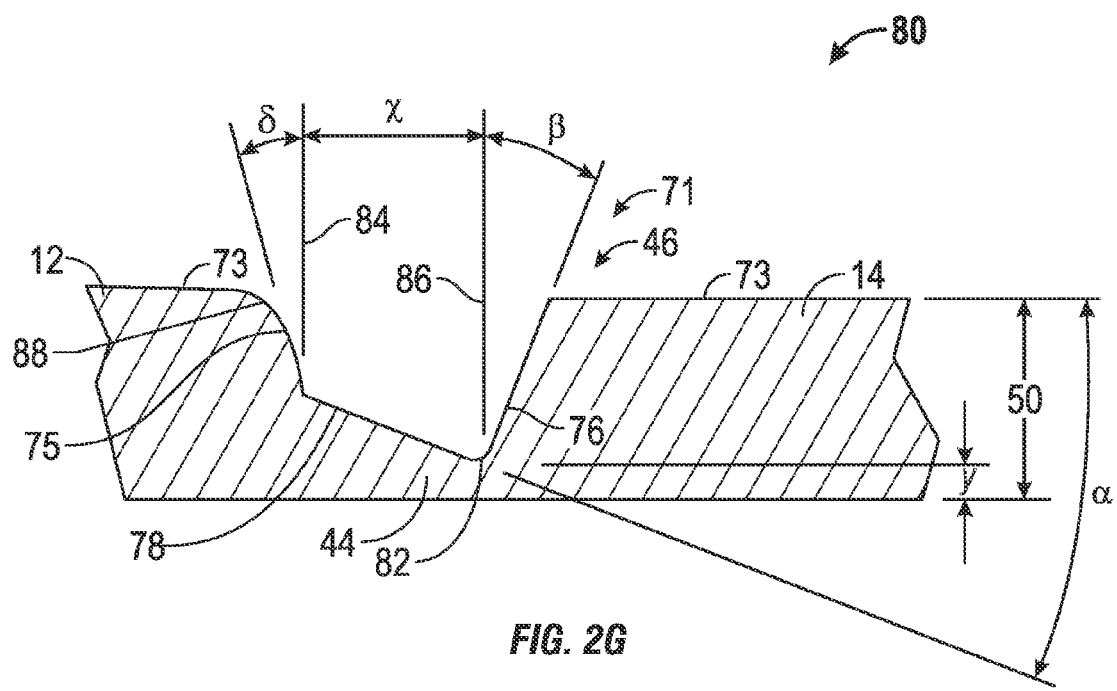
Figure 2H:
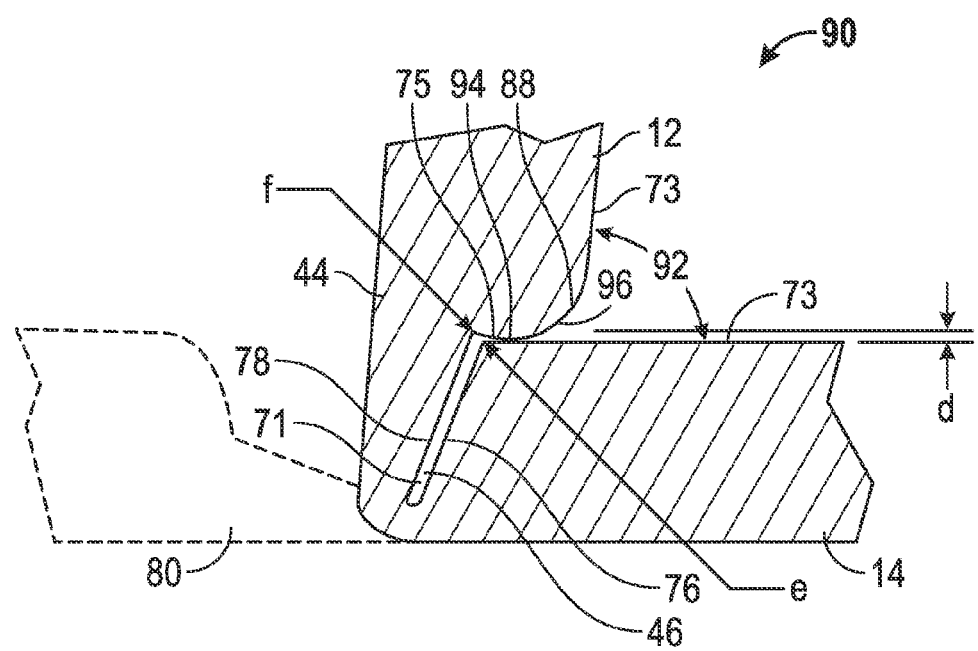

Referring to FIGS 2G-2H, in an exemplary embodiment, the fold-initiating groove 46 of the hinge section 44 may be configured as a wide-base channel 71 that is formed through a hinge outer surface 73. As illustrated, the wide-base channel 71 has a first sidewall surface 75, a second sidewall surface 76, and a recessed-base surface 78 that extends between the first and second sidewall surfaces 75 and 76. When the hinge section 44 is in an unfolded condition 80, as illustrated in FIG. 2G, the recessed-base surface 78 extends from the first sidewall surface 75 to the second sidewall surface 76 for a distance x defined parallel to the hinge outer surface 73 and at an angle α defined relative to the hinge outer surface 73. In an exemplary embodiment, the distance x is from about 2 to about 6 mm depending upon the average thickness 50 of the first and second walls 12 and 14, and the angle α is from about 0 to about 25°. A lowest-most portion 82 of the wide-base channel 71 corresponds to a hinge line and defines a fold-initiator thickness y (e.g., similar to reduced thickness 48 illustrated in FIG. 2A) that is less than the average thickness 50 of the first and second walls 12 and 14. In an exemplary embodiment, the fold-initiator thickness y is from about 0.75 to about 2.5 mm depending upon the average thickness 50. The first sidewall surface 75 extends between the hinge outer surface 73 and the recessed-base surface 78 at an angle δ defined relative to a first transverse plane 84 to the hinge outer surface 73. In an exemplary embodiment, the angle δ is from about 1 to about 30°. The second sidewall surface 76 extends between the hinge outer surface 73 and the recessed-base surface 78 at an angle β defined relative to a second transverse plane 86 to the hinge outer surface 73. In an exemplary embodiment, the angle β is from about 1 to about 40°. The hinge outer surface 73 and the first sidewall surface 75 converge to define a curved surface 88. The curved surface 88 may be a splined surface, a conical surface, a surface having a radius z, or the like. In an exemplary embodiment, the radius z is from about 1 to about 4 mm.

In an exemplary embodiment, when the hinge section 44 is in a folded condition 90, as illustrated in FIG. 2H, the recessed-base surface 78 is positioned adjacent and substantially parallel to the second sidewall surface 76 to define a folded angle 92 between the first and second walls 12 and 14. In an exemplary embodiment, the folded angle 92 can be acute, 90°, or obtuse. The first sidewall surface 75 is disposed over and spaced apart from the hinge outer surface 73 to define a gap d formed between a lowest-most point 94 of the curved surface 88 and the hinge outer surface 73. In an exemplary embodiment, the gap d is from about 0.5 to about 1.5 mm. The curved surface 88 is configured as a close-out ridge 96 that inhibits debris from passing through the gap d into the fold-initiating groove 46. As illustrated, the first sidewall surface 75 and the recessed-base surface 78 converge to define a radius f and the second sidewall surface 76 and the hinge outer surface 73 converge to define a radius e. In an exemplary embodiment, the radius f is from about 1 to about 4 mm and the radius e is greater than the radius f.

Additionally, it is to be appreciated that one or more of the walls 12, 14, 16, 18, and/or 20 may include one or more features formed in the natural fiber-resin impregnated blank sections 22, 24, 26, 28, and/or 30 and/or the polymeric resin 34 for energy management including stiffening or weakening, positioning and/or locating, stops, and the like. Non-limiting examples of such features include cutouts, stiffening beads, grooves not intended for folding, channels, tongue and groove arrangements, folded tabs, unfolded tabs, boxes, and the like.

Figure 4:
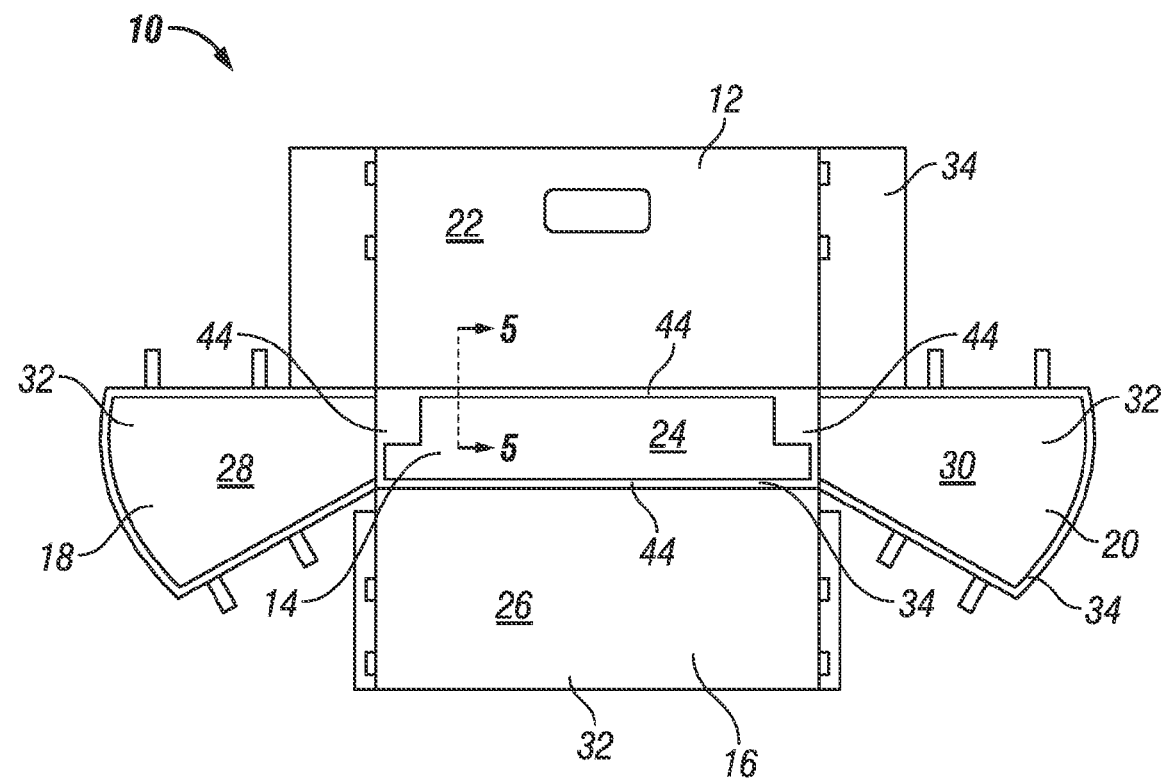
FIG. 4 is a plan view of a foldable substrate in accordance with an exemplary embodiment.
Figure 5:
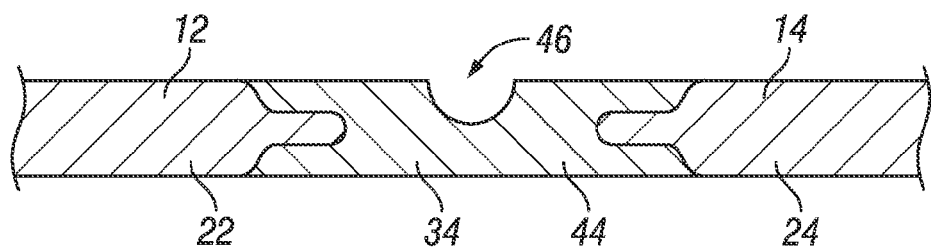
FIG. 5 is a sectional view of a portion of the foldable substrate depicted in FIG. 4 along line 5-5 in accordance with an exemplary embodiment.

Referring to FIG. 4, a plan view of a foldable substrate 10 in accordance with another exemplary embodiment is provided. In this embodiment, the natural fiber-resin impregnated blank 32 is discontinuous (e.g. split) and the natural fiber-resin impregnated blank sections 22, 24, 26, 28, and 30 are separated and space apart from each other. In particular and also with reference to FIG. 5, the polymeric resin 34 is overmolded onto the natural fiber-resin impregnated blank sections 22, 24, 26, 28, and 30 to form the hinge section 44 to hingedly connect the walls 12, 14, 16, 18, and 20 together. A fold-initiating groove 46 or other fold-initiating feature as discussed above is formed in the polymeric resin 34 for locally focusing folding stresses and to define the hinge section 44.

Referring to FIGS. 2D-2F, sectional views of a portion of a foldable substrate 10 along a hinge section 44 in accordance with another exemplary embodiment are provided. As illustrated, the hinge section 44 may comprise a thermoplastic strip 70 that is affixed to the first and second walls 12 and 14. The thermoplastic strip 70 may be a nonwoven thermoplastic textile, a woven thermoplastic textile, a thermoplastic sheet reinforced with fibers (inorganic or organic fibers), a thermoplastic elastomer, a thermoplastic film, or the like. By using the thermoplastic strip 70 to form at least a portion of the hinge section 44, the material used for thermoplastic strip 70 may be selected to provide a very flexible and substantially reinforced hinge section 44 for robust folding. Preferably for manufacturing and economical reasons, the thermoplastic strip 70 is affixed to the first and second walls 12 and 14 during the compression molding process for forming the first and second natural fiber-resin impregnated blank sections 22 and 24. In particular, heat and pressure produced during the compression molding process may be used to melt fuse the thermoplastic strip 70 to the first and second natural fiber-resin impregnated blank sections 22 and 24. Alternatively, the thermoplastic strip may be affixed to the first and second walls 12 and 14 after the compression molding process. Attachment of the thermoplastic strip 70 to the first and second walls 12 and 14 may be mechanical, chemical, and/or adhesive (e.g., adhesively bonded). In one embodiment and as illustrated in FIG. 2F, a gap 98 is formed between the first and second walls 12 and 14 adjacent to the thermoplastic strip 70. In this embodiment, folding of the first and second walls 12 and 14 is advantageously facilitated if the thermoplastic strip 70 has relatively low elasticity (e.g., substantially inelastic), such as, for example, if the thermoplastic strip 70 comprises continuous interwoven fiber reinforcements or otherwise that limit its elongation. In particular, the gap 98 facilitates folding by allowing the first and second walls 12 and 14 to move as needed in the gap 98 during folding while minimizing stretching of the thermoplastic strip 70.

Figure 6:
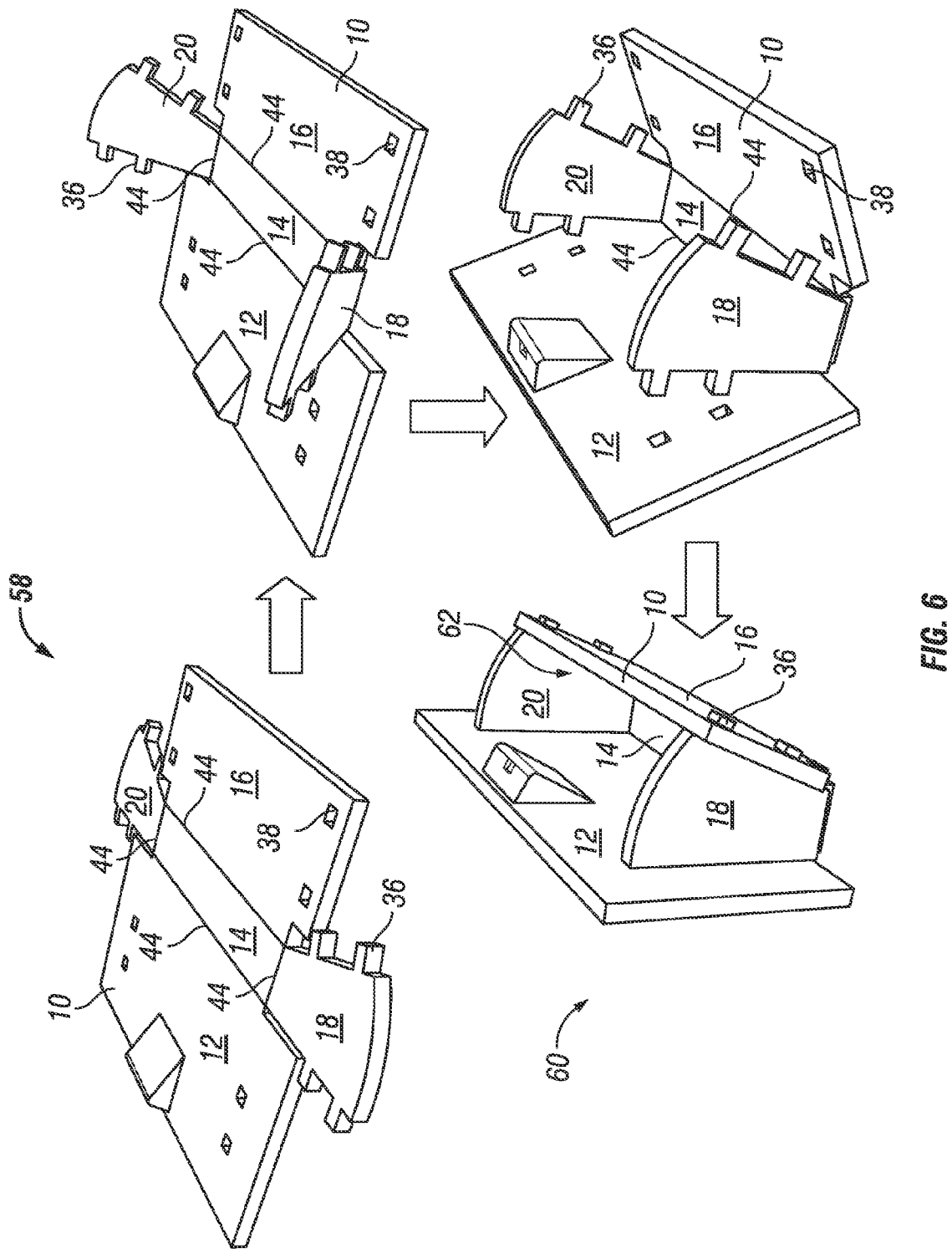
FIG. 6 is a perspective view of a sequence for folding a foldable substrate from an unfolded condition to a folded condition in accordance with an exemplary embodiment.

Referring to FIG. 6, a perspective view of a sequence for folding the foldable substrate 10 from an unfolded condition 58 to a folded condition 60 in accordance with an exemplary embodiment is provided. As illustrated, the foldable substrate 10 in the unfolded condition 58 (e.g. "as molded") is relatively flat and/or has a low profile so that the substrate can be efficiently stacked for packaging and shipping. To fold the foldable substrate 10 to the folded condition 60, the fourth and fifth walls 18 and 20 are folded along the hinge section 44 inward towards each other and positioned upright. The first and third walls 12 and 16 are then folded along the hinge section 44 inward towards each other such that the negative features 38 formed in the first and third walls 12 and 16 are aligned with the positive features 36 projecting outwardly from the fourth and fifth walls 18 and 20. In one embodiment, the positive and negative features 36 and 38 facilitate locating the walls 12, 14, 16, 18, and 20 in the folded condition 60. The positive and negative features 36 and 38 may be configured and aligned to provide two-way, four-way, or combinations thereof locator schemes as are commonly known in the art. When the foldable substrate 10 is in the folded condition 60, the positive and/or negative features 36 and 38 may be configured and used to secure the foldable substrate 10 in the folded condition 60 via heat staking, welding, snap fitting, or the like. As illustrated, the foldable substrate 10 in the folded condition 60 has a relatively high profile and defines a cavity 62 that may be suitable as a storage compartment for a motor vehicle.

Figure 8:
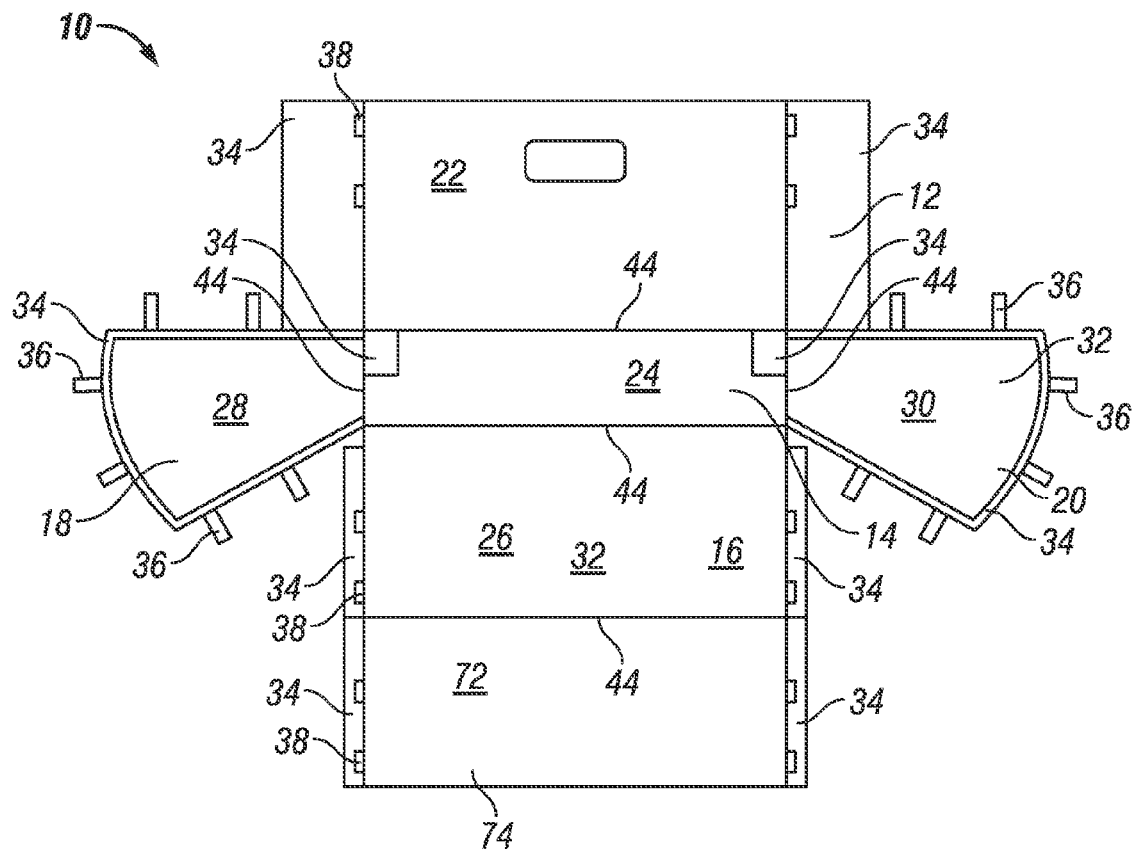
FIG. 8 is a plan view of a foldable substrate in accordance with an exemplary embodiment.
Figure 9:
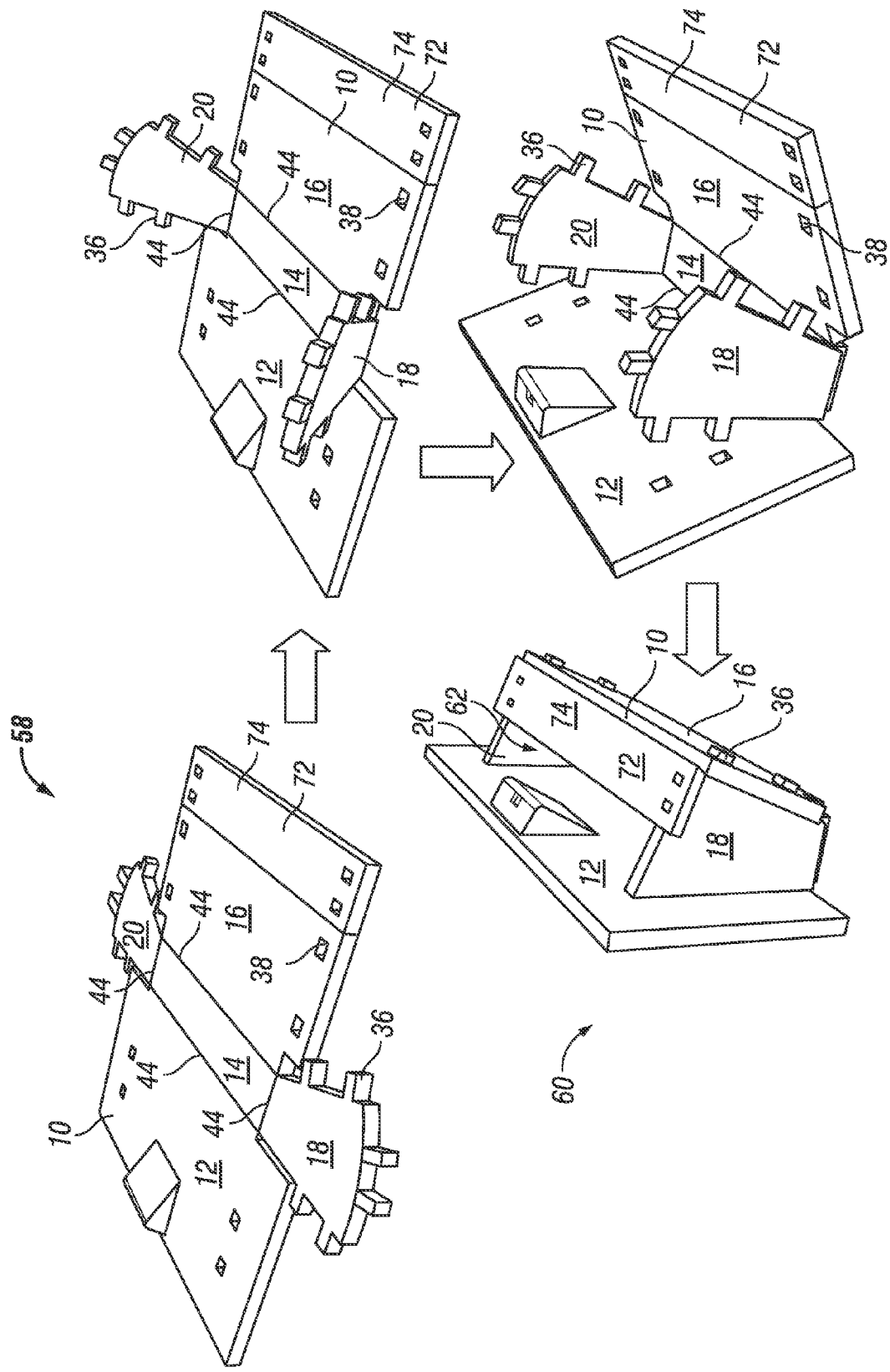
FIG. 9 is a perspective view of a sequence for folding the foldable substrate depicted in FIG. 8 in accordance with an exemplary embodiment.

Referring to FIG. 8, a plan view of a foldable substrate 10 in accordance with an exemplary embodiment is provided. As illustrated, the foldable substrate 10 comprises six walls including the first, second, third, fourth, and fifth walls 12, 14, 16, 18, and 20 as illustrated in FIG. 1, and further comprises a sixth wall 72 that is hingedly connected to the third wall 16. The sixth wall 72 comprises a sixth natural fiber-resin impregnated blank section 74 that is overmolded with a quantity of polymeric resin 34. The sixth wall 72 defines a partial or complete close-out panel for creating a barrier, such as, for example, for various objects that may be contained within a cavity 62 (see FIG. 9) when the foldable substrate 10 is in a folded condition 60.

Additionally, it is to be appreciated that any of the walls 12, 14, 16, 18, 20, and/or 72 may include one or more features formed in their corresponding natural fiber-resin impregnated blank section 22, 24, 26, 28, 30, and/or 74 and/or in the polymeric resin 34 for energy management including stiffening or weakening features, positioning and/or locating features, stops, and/or the like. Non-limiting examples of such features include cutouts, stiffening beads, groove not intended for folding, channels, tongue and groove arrangements, folded tabs, unfolded tabs, boxes, and the like.

Figure 7:
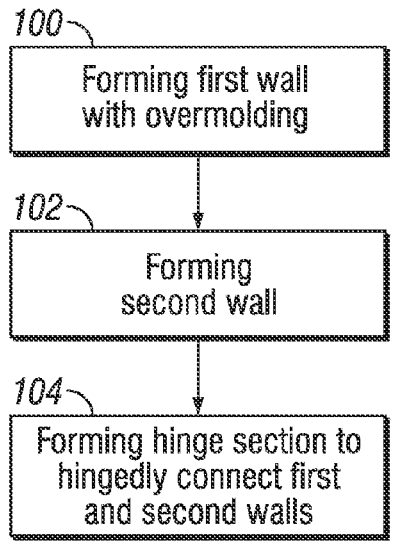
FIG. 7 is a flowchart of an example of a method for making a foldable substrate in accordance with an exemplary embodiment.

Referring to FIG. 7, a flowchart of an example of a method for making a foldable substrate in accordance with an exemplary embodiment is provided. The method comprises the steps of forming a first wall at step 100 having a first outer surface and comprising a first natural fiber-resin impregnated blank section that is overmolded with a polymeric resin. The polymeric resin forms at least a portion of the first outer surface. A second wall is formed at step 102 having a second outer surface and comprising a second natural fiber-resin impregnated blank section. The second natural fiber-resin impregnated blank section forms at least a portion of the second outer surface. A hinge section to hingedly connect the first and second walls together is formed at step 104. The hinge section is formed having at least one fold-initiating groove, at least one slit, at least one perforation, or a combination thereof to facilitate folding of the foldable substrate from an unfolded condition to a folded condition.

In one embodiment, the first and second natural fiber-resin impregnated blank sections are formed by compression molding a natural fiber-resin impregnated sheet in a heated condition and cooling the compressed sheet to form the natural fiber-resin impregnated blank. In a preferred embodiment primarily for simplicity and cost reasons, the hinge section is defined in the natural fiber-resin impregnated blank during compression molding via a positive feature or actuating feature in the mold while the natural fiber-resin impregnated sheet is in the heated condition. Alternatively, the hinge section may be formed subsequent to compression molding via cutting, punching, or routering the natural fiber-resin impregnated blank.

The natural fiber-resin impregnated blank may be die-cut to define its outer perimeter, to segment the blank into sections, and/or to help form the hinge section. At least a portion of at least the first section of the natural fiber-resin impregnated blank is overmolded with polymeric resin to complete formation of the first and/or second walls. In one embodiment, the first natural fiber-resin impregnated blank section, the second natural fiber-resin impregnated blank section, or a combination thereof is overmolded with the polymeric resin to form the hinge section, which may provide greater design flexibility for the foldable substrate.

Accordingly, foldable substrates and methods for making foldable substrates for a motor vehicle have been described. Unlike the prior art, the exemplary embodiments taught herein provide a foldable substrate comprising at least two walls including a first wall hingedly connected to a second wall where each of the walls comprises a section from a natural fiber-resin impregnated blank. The natural fiber-resin impregnated blank is relatively stiff and comprises natural fibers and a resin that binds the natural fibers together. The natural fiber-resin impregnated blank also has a relatively high specific modulus and a relatively low area weight. Separated or continuous sections of the natural fiber-resin impregnated blank are used to form the first and second walls of the foldable substrate. The first and second walls are formed by molding a polymeric resin over at least a portion of at least one of the sections of the natural fiber-resin impregnated blank such that at least at portion of the first wall comprises a natural fiber-resin impregnated blank section overmolded with the polymeric resin and the second wall comprises a natural fiber-resin impregnated blank section that may or may not be overmolded with the polymeric resin. A hinge section is formed for hingedly connecting the first and second walls for folding the foldable substrate from an unfolded condition to a folded condition. Preferably, the foldable substrate is formed substantially of the natural fiber-resin impregnated blank with some overmolded plastic or other polymeric material as needed for functionality and aesthetics so that the substrate has a low area weight for a significant weight savings. Moreover, preferably the walls of the foldable substrate are relatively flat and/or have relatively simple 3-Dimensional geometries such that when the foldable substrate is in the unfolded condition, it has a relatively low profile so that the substrate can be efficiently stacked for packaging and shipping to provide a cost benefit.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention, it being understood that various changes may be made in the function and arrangement of elements described in an exemplary embodiment without departing from the scope of the invention as set forth in the appended Claims and their legal equivalents.

What is claimed is:

1. A foldable substrate for a motor vehicle, the foldable substrate comprising:
    a first wall having a first outer surface and comprising a first natural fiber-resin impregnated blank section that is overmolded with a first quantity of polymeric resin that forms at least a portion of the first outer surface;
    a second wall having a second outer surface and comprising a second natural fiber-resin impregnated blank section that forms at least a portion of the second outer surface, wherein the first and second walls are hingedly connected together; and
    a hinge section that hingedly connects the first and second walls and that defines at least one fold-initiating groove to facilitate folding of the foldable substrate from an unfolded condition to a folded condition, wherein the hinge section comprises a portion of a continuous natural fiber-resin impregnated blank defining the at least one fold-initiating groove, wherein the continuous natural fiber-resin impregnated blank further comprises the first and second natural fiber-resin impregnated blank sections, wherein the continuous natural fiber-resin impregnated blank has a flexural modulus of about 90 MPa or less, wherein the hinge section has a hinge outer surface and defines the at least one fold-initiating groove configured as a wide-base channel that is formed through the hinge outer surface, wherein the wide-base channel is defined by a first sidewall surface, a second sidewall surface, and a recessed-base surface that extends between the first and second sidewall surfaces, and wherein when the hinge section is in the unfolded condition the recessed-base surface extends from the first sidewall surface to the second sidewall surface as a substantially planar surface at an incline in which a lowest-most portion of the wide-base channel corresponds to a hinge line and defines a fold-initiator thickness y that is less than an average thickness of the first and second walls, and the lowest-most portion of the wide-base channel is positioned at or immediately adjacent to where the second sidewall surface merges with the recessed-base surface and is spaced apart from the first sidewall surface such that when the hinge section is in the folded condition the first sidewall surface is disposed directly over the hinge outer surface.

2. The foldable substrate according to claim 1, wherein the hinge section further defines at least one slit, at least one perforation, or combinations thereof to facilitate folding of the foldable substrate from the unfolded condition to the folded condition.

3. The foldable substrate according to claim 2, wherein the hinge section comprises a second quantity of polymeric resin that is at least partially overmolded onto the first natural fiber-resin impregnated blank section, the second natural fiber-resin impregnated blank section, or a combination thereof.

4. The foldable substrate according to claim 1, wherein the foldable substrate is in the unfolded condition and the first and second walls extend outwardly from the hinge section such that the foldable substrate has a low profile relative to the foldable substrate in the folded condition.

5. The foldable substrate according to claim 1, wherein the foldable substrate is in the folded condition and the first and second walls extend outwardly from the hinge section such that the foldable substrate has a higher profile relative to the foldable substrate in the unfolded condition.

6. The foldable substrate according to claim 1, further comprising a third wall having a third outer surface and comprising a third natural fiber-resin impregnated blank section that is overmolded with a third quantity of polymeric resin that forms at least a portion of the third outer surface, wherein the second and third walls are hingedly connected together.

7. The foldable substrate according to claim 6, wherein the first quantity of polymeric resin, the third quantity of polymeric resin, or a combination thereof forms a plurality of features including at least one positive feature, at least one negative feature, or combinations thereof for locating, securing, or a combination thereof the foldable substrate in the folded condition.

8. The foldable substrate according to claim 6, wherein the first and third walls are secured in the folded condition via at least one heat stake, at least one weld, at least one snap fit feature, or combinations thereof.

9. The foldable substrate according to claim 6, wherein the second wall has a first side and a second side that are disposed opposite of each other and a third side and a fourth side that are disposed opposite of each other, and wherein the foldable substrate further comprises a fourth wail having a fourth outer surface and a fifth wall having a fifth outer surface, the fourth wall comprising a fourth natural fiber-resin impregnated blank section that is overmolded with a fourth quantity of polymeric resin that forms at least a portion of the fourth outer surface, the fifth wall comprising a fifth natural fiber-resin impregnated blank section that is overmolded with a fifth quantity of polymeric resin that forms at least a portion of the fifth outer surface, and wherein the first wall and the third wall are hingedly connected to the second wall respectively along the first side and the second side, and the fourth wall and the fifth wall are hingedly connected to the second wall respectively along the third side and the fourth side, and wherein the foldable substrate defines a cavity when in the folded condition.

10. The foldable substrate according to claim 9, further comprising a sixth wall having a sixth outer surface and comprising a sixth natural fiber-resin impregnated blank section that is overmolded with a sixth quantity of polymeric resin that forms at least a portion of the sixth outer surface, and wherein the sixth wall is hingedly connected to the third wall, and wherein the sixth wall defines a partial or complete close-out panel for creating a barrier for objects contained within the cavity when the foldable substrate is in the folded condition.

11. The foldable substrate according to claim 1, wherein when the hinge section is in the unfolded condition the recessed-base surface extends from the first sidewall surface to the second sidewall surface for a distance x defined parallel to the hinge outer surface and at an angle α defined relative to the hinge outer surface, the first sidewall surface extends between the hinge outer surface and the recessed-base surface at an angle δ defined relative to a first transverse plane to the hinge outer surface and the second sidewall surface extends between the hinge outer surface and the recessed-base surface at an angle β defined relative to a second transverse plane to the hinge outer surface, and the hinge outer surface and the first sidewall surface converge to define a curved surface.

12. The foldable substrate according to claim 11, wherein when the hinge section is in the folded condition the recessed-base surface is positioned adjacent and substantially parallel to the second sidewall surface to define a folded angle between the first and second walls, the first sidewall surface is disposed over and spaced apart from the hinge outer surface to define a gap d formed between a lowest-most point of the curved surface and the hinge outer surface, and the curved surface is configured as a close-out ridge that inhibits debris from passing through the gap into the fold-initiating groove.

13. The foldable substrate according to claim 1, further comprising a hinge section that comprises a thermoplastic strip affixed to the first and second walls to facilitate folding of the foldable substrate from an unfolded condition to a folded condition, and wherein the thermoplastic strip is formed from a material selected from the group consisting of a nonwoven thermoplastic textile, a woven thermoplastic textile, a thermoplastic sheet reinforced with fibers, a thermoplastic elastomer, and a thermoplastic film.

14. A method for making a foldable substrate for a motor vehicle, the method comprising the steps of:

forming a first wall having a first outer surface and comprising a first natural fiber-resin impregnated blank section that is overmolded with a polymeric resin that forms at least a portion of the first outer surface;

forming a second wall having a second outer surface and comprising a second natural fiber-resin impregnated blank section that forms at least a portion of the second outer surface; and forming a hinge section to hingedly connect the first and second walls together, wherein forming the hinge section includes defining at least one fold-initiating groove in the hinge section to facilitate folding of the foldable substrate from an unfolded condition to a folded condition, wherein the hinge section comprises a portion of a continuous natural fiber-resin impregnated blank defining the at least one fold-initiating groove, wherein the continuous natural fiber-resin impregnated blank further comprises the first and second natural fiber-resin impregnated blank sections, wherein the continuous natural fiber-resin impregnated blank has a flexural modulus of about 90 MPa or less, wherein the hinge section has a hinge outer surface and defines the at least one fold-initiating groove configured as a wide-base channel that is formed through the hinge outer surface, wherein the wide-base channel is defined by a first sidewall surface, a second sidewall surface, and a recessed-base surface that extends between the first and second sidewall surfaces, and wherein when the hinge section is in the unfolded condition the recessed-base surface extends from the first sidewall surface to second sidewall surface as a substantially planar surface at an incline in which a lowest-most portion of the wide-base channel corresponds to a hinge line and defines a fold-initiator thickness y that is less than an average thickness of the first and second walls, and the lowest-most portion of the wide-base channel is positioned at or immediately adjacent to where the second sidewall surface merges with the recessed-base surface and is spaced apart from the first sidewall surface such that when the hinge section is in the folded condition the first sidewall surface is disposed directly over the hinge outer surface.

* * * * *